United States Patent
Umetsu

(10) Patent No.: US 7,440,074 B2
(45) Date of Patent: Oct. 21, 2008

(54) METHOD FOR REPAIR OF LIQUID CRYSTAL DISPLAY DEVICE LIGHT POINT DEFECTS USING DETECTION OF CORRECTIVE LASER LIGHT IN REAL TIME

(75) Inventor: Kazushige Umetsu, Nagano (JP)

(73) Assignee: Seiko Epson Corporation (JP)

( * ) Notice: Subject to any disclaimer, the term of this patent is extended or adjusted under 35 U.S.C. 154(b) by 262 days.

(21) Appl. No.: 11/195,800

(22) Filed: Aug. 2, 2005

(65) Prior Publication Data

US 2006/0050223 A1    Mar. 9, 2006

(30) Foreign Application Priority Data

Sep. 6, 2004    (JP)    ............... 2004-258613

(51) Int. Cl.
*G02F 1/13*    (2006.01)

(52) U.S. Cl. ................. 349/192; 349/54; 349/55; 349/123; 349/124

(58) Field of Classification Search .......... 349/54, 349/55, 192, 123, 124
See application file for complete search history.

(56) References Cited

U.S. PATENT DOCUMENTS

| 5,926,246 A | 7/1999 | Tomita et al. |
| 6,097,462 A | 8/2000 | Koe |
| 6,628,355 B1 * | 9/2003 | Takahara ............. 349/106 |
| 2004/0051817 A1 * | 3/2004 | Takahashi et al. ....... 349/1 |

FOREIGN PATENT DOCUMENTS

| CN | 1410821 | 9/2002 |
| JP | 60-243635 | 12/1985 |
| JP | 06-130390 | 5/1994 |
| JP | 08-184830 | 7/1996 |
| JP | 08-201813 | 8/1996 |
| JP | 09-090304 | 4/1997 |
| JP | 09-146060 | 6/1997 |
| JP | 09-258155 | 10/1997 |
| JP | 10-062734 | 3/1998 |

(Continued)

*Primary Examiner*—Andrew Schechter
*Assistant Examiner*—Matthew Tynan
(74) *Attorney, Agent, or Firm*—Harness, Dickey & Pierce, P.L.C.

(57) ABSTRACT

An object of the present invention is to provide a method for repairing light point defects in which light points can be converted to black spots through a simple process without affecting surrounding pixels, and the repaired pixels can be maintained without their returning to light points even with the passage of time.

The present invention provides a method for repairing light point defect pixels of a liquid crystal display device having a liquid crystal panel which comprises a pair of substrates, a liquid crystal layer interposed between the pair of substrates, and a pair of alignment films each of which is provided between the substrate and the liquid crystal layer restraining the orientation of the liquid crystals of the liquid crystal layer. The defect repair method includes the step of irradiating laser light onto a region of the alignment film corresponding to the light point defect pixels to locally reduce or eliminate the orientation restraining force of the alignment film, wherein the light point defect pixels are repaired by reducing the intensity of the light transmitted through the region where the orientation restraining force is reduced or eliminated when the liquid crystal is illuminated.

2 Claims, 6 Drawing Sheets

FOREIGN PATENT DOCUMENTS

| | | |
|---|---|---|
| JP | 11-264961 | 9/1999 |
| JP | 2001-021890 | 1/2001 |
| JP | 2002-341304 | 11/2002 |
| JP | 2003-107479 | 4/2003 |
| JP | 2003-241155 | 8/2003 |

* cited by examiner

METHOD FOR REPAIR OF LIQUID CRYSTAL DISPLAY DEVICE LIGHT POINT DEFECTS USING DETECTION OF CORRECTIVE LASER LIGHT IN REAL TIME

RELATED APPLICATIONS

This application claims priority to Japanese Patent Application No. 2004-258613 filed Sep. 6, 2004 which is hereby expressly incorporated by reference herein in its entirety.

BACKGROUND

The present invention relates to a method and apparatus for repairing pixel defects in liquid crystal display devices.

Among the defects which occur in the manufacturing process of liquid crystal display devices, there are defects so serious that the subject liquid crystal display device must be scrapped. When the defects are not so serious, the device may be considered a good product and shipped even if that defect is left as is.

For example, in the case of normally white display devices of which pixels are white while voltage is not applied, defective pixels that allow light pass through themselves when voltage is applied and non-defective pixels are driven black (hereinafter referred to as "light point defect" pixels) are quite easy to recognize considering human visual perception characteristics and thus become conspicuous defects. Consequently, liquid crystal display devices having light point defects are usually treated as defective products and cannot be shipped as good products.

Light point defects occur due to a variety of causes, such as opened contact hole, residual ITO fragments, inter-electrode leaks in the thin film transistors and the like which make up the pixel circuits, inter-pixel shorts due to foreign matter such as metal fragments, and light scattering due to foreign matter. As a result, it is difficult to repair each defect by a method corresponding to each cause.

On the other hand, defective pixels which remain black when voltage is applied and non-defective pixels are driven white (hereinafter referred to as "black spot defect" pixels) are less striking to human eyes than pixels with light point defects. As a result, even if a liquid crystal display device has black spot defects, depending on their extent, in some cases the products may be treated as good.

In this regard, methods have been studied which aim, by applying some kind of processing to light point defects and converting them to black spot defects and thus repairing defective products, to increase yields and reduce production cost. For example, in Patent Laid-Open Publication No. Hei 9-90304 a method is proposed whereby conversion to black spot is accomplished by irradiating a defective pixel of a liquid crystal device with a first laser light, thus causing air bubbles to form in the liquid crystal layer peripheral to and including the defective pixel, and in this state where air bubbles have been formed, irradiating that defective pixel with a second laser light so that, through that energy, the constituent material of that defective pixel is made to spatter within the air bubble causing the adhesion and accumulation of the spattered matter onto the opposing electrodes of the liquid crystal display device.

SUMMARY

However, with the conventional method explained above which causes bubbles to be generated, it is hard to maintain long-term the changes made to the properties of the liquid crystal layer at the site of defective pixel. There were also cases where the spattered materials that had adhered to and accumulated on the electrodes dropped on the once repaired pixels, which made the repaired pixels into light point defect pixels again.

To deal with this, an object of the present invention is to provide a repair method for light point defects whereby the repaired condition can be maintained long-term.

In order to solve the above-mentioned problem, the method for repair of a liquid crystal device defect of the present invention is a method for repairing light point defect pixels of a liquid crystal device having a liquid crystal panel which comprises a pair of substrates, a liquid crystal layer interposed between the pair of substrates, and alignment films each provided between the substrates and the liquid crystal layer, which restrain the orientation of the liquid crystal molecules of the liquid crystal layer; the method comprising the step of irradiating laser light onto a region corresponding to the light point defect pixels of the alignment film and locally reducing or eliminating the orientation restraining force of the alignment film, wherein the light point defect pixels are repaired by reducing, when the liquid crystal is illuminated, the intensity of the light transmitted through the region where the orientation restraining force is reduced or eliminated.

Liquid crystal displays switch between light and dark by applying voltage and changing the orientation of the liquid crystal molecules. For example, in TN-type liquid crystal display devices, the liquid crystal molecules are sandwiched between two alignment films, the axes of the alignment of which are perpendicular to each other. Then, in the state where no voltage is applied to the pixels, because the liquid crystal molecules are aligned in a twisted structure in conformance to this orientation restraining force, the oscillation component of the incident light is made to rotate 90 degrees. However, with the defect repair method of the present invention, by irradiating laser light onto a region of the alignment film corresponding to the light point defect pixel, the orientation restraining force can be locally reduced or eliminated, and consequently the liquid crystal molecules will no longer be oriented in conformance to the alignment film. As a result, in the state where voltage is not applied to a pixel, the oscillation component of the incident light is not rotated, even though it is transmitted through the liquid crystal layer.

In liquid crystal display devices, the liquid crystal panels are positioned between two polarizing plates. One of the polarizing plates passes through the light having oscillation components different by 90 degrees from those of the light passed through by the other polarizing plate. As a result, the light transmitted through the incident side polarizing plate, so long as its oscillation component is not rotated by the liquid crystal layer, cannot be transmitted through the polarizing plate of the light exiting side. Consequently, pixels for which the orientation restraining force is reduced or eliminated will appear as black spots.

On the other hand, in the state where voltage is applied, because the liquid crystal molecules are arranged in a direction perpendicular to the substrate, the light incident to the liquid crystal layer cannot be transmitted through the light exiting side, as its oscillation component is not rotated. In the above manner, light point defect pixels which have been irradiated with laser light and the orientation restraining force of their alignment film reduced or eliminated are made to become black spots which never transmit light regardless of whether or not voltage is applied.

To irradiation of the light point defect pixels, a laser light having a wavelength that the alignment film can absorb is used. For example, in the case of alignment films comprise organic films or polymer films, such as polyimide, it is preferable to use laser beam of wavelength 450 nm or less. Further, it is preferable that the wavelength of the laser beam be 200 nm or greater, so that the substrate does not absorb the laser light.

Also, with the repair method for the liquid crystal device defect of the present invention, when laser light is irradiated, polarizing plates are positioned on one side of the liquid crystal panel and on the other respectively, and axes of polarization are set so that light transmitted through one of the polarizing plates can be transmitted through the other polarizing plate when the orientation restraining force of the alignment film is eliminated. It is also preferable that a process step also be included for detecting that the properties of the alignment film in the region corresponding to the light point defect pixel have changed.

If the axes of polarization are set so that light transmitted through one of the polarizing plates can be transmitted through the other polarizing plate when the orientation restraining force of the alignment film is eliminated, then the irradiated laser light cannot be transmitted through that other polarizing plate until the orientation restraining force of the alignment film is sufficiently reduced. However, by irradiating the film for a certain period of time, the orientation restraining force is reduced and, in proportion, the amount of the laser light being transmitted through that other polarizing plate increases. Consequently, if the amount of the laser light transmitted through the polarizing plate positioned at the light exiting side of the liquid crystal panel is measured, the degree to which the orientation restraining force of the alignment film in the region corresponding to the light point defect pixel is reduced can be evaluated.

Further, the present invention provides an apparatus for defect repair of a liquid crystal display device, comprising: a laser oscillator; a stand on which is mounted a liquid crystal display device; means for controlling the irradiation position so that laser light outputted from the laser oscillator is irradiated onto light point defect pixels of the liquid crystal display device; and a detector for detecting the amount of laser light transmitted through the liquid crystal display device. Part of or all the stand is optically transparent, and the degree of defect elimination of the light point defect pixel can be evaluated by detecting with the detector the amount of the laser light, irradiated onto the light point defect pixels, that is transmitted through the liquid crystal display device.

As explained above, by positioning the polarizing plates, on the one side and the other side of the liquid crystal panel, so that light transmitted through one of the plates can be transmitted through the other polarizing plate when the orientation restraining force of the alignment film is eliminated, and by measuring the amount of the laser light transmitted through both of the two polarizing plates, the degree to which the orientation restraining force of the alignment film in the region corresponding to the light point defect pixel is reduced can be evaluated. Consequently, by configuring the system so that a part or all of the stand which holds the liquid crystal display device is optically transparent and the amount of the laser light irradiated onto the light point defect pixel that is transmitted through the liquid crystal display device can be detected by a detector, the laser light irradiated onto the light point defect pixel in order to change the properties of the alignment film can also be used to evaluate the progress toward becoming a black spot. Thus there is the benefit that it is not necessary to provide a separate light source for detecting the light transmitted through the light point defect pixel.

DETAILED DESCRIPTION

Figure 1A:
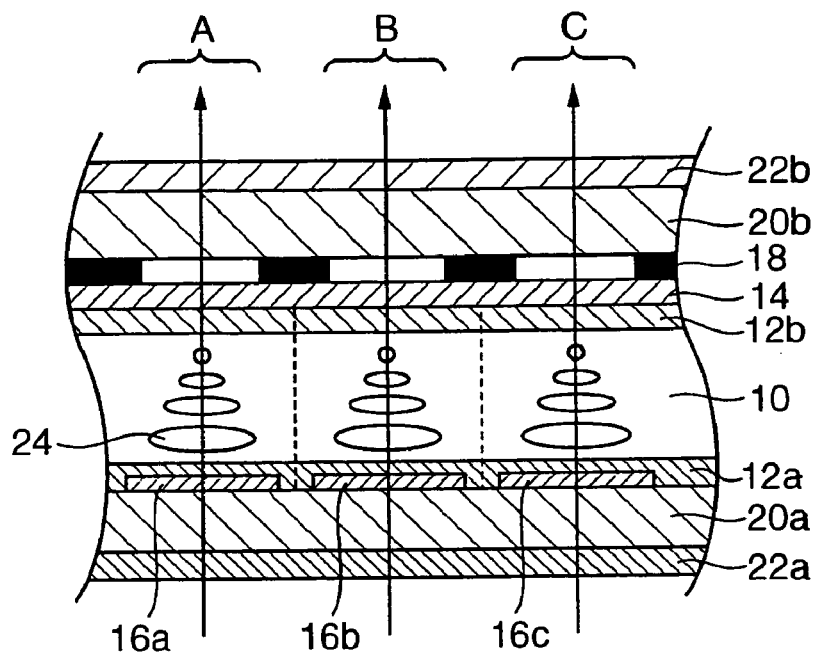
FIG. 1(A) shows the state where voltage is not applied to the pixels and FIG. 1(B) the state where voltage is applied to the pixels.

The preferred embodiments of the present invention are described below, referring to the figures.

First, using FIG. 1 and FIG. 2, the liquid crystal display device defect repair method of the present invention is described, taking a TN-mode liquid crystal display device as an example. FIG. 1 and FIG. 2 each show cross-sectional diagrams of three pixels, A, B, and C. Each pixel comprises a liquid crystal panel made up of a pair of glass substrates 20a and 20b, a liquid crystal layer 10 interposed between the substrates, and alignment films 12a and 12b each provided between the substrates 20a and 20b and the liquid crystal layer 10. The alignment films 12a and 12b are composed of polyimide. The direction of the force which restrains the orientation, in other words the orientation restraining force, of the alignment film 12a is perpendicular to that of the alignment film 12b. Also, between the glass substrate 20a and the alignment film 12a, pixel electrodes 16a through 16c are provided, and between the glass substrate 20b and the alignment film 12b an opposing electrode 14 and a black mask 18 are provided. On the surfaces of the glass substrates 20a and 20b, polarizing plates 22a and 22b are provided, so that they respectively transmit oscillation components differing by 90 degrees.

In the liquid crystal display device of FIG. 1, pixel B is a light point defect pixel.

When voltage is not applied to the pixels, as shown in the patterns of pixels A through C of FIG. 1(A), due to the orientation restraining force of the alignment film, liquid crystal molecules 24, included in the liquid crystal layer, are aligned in a twisted alignment configuration. In this way, the oscillation component of light transmitted through the polarizing plate 22a is rotated 90 degrees during passing through liquid crystal layer 10, and it can be transmitted through polarizing plate 22b.

Figure 1B:
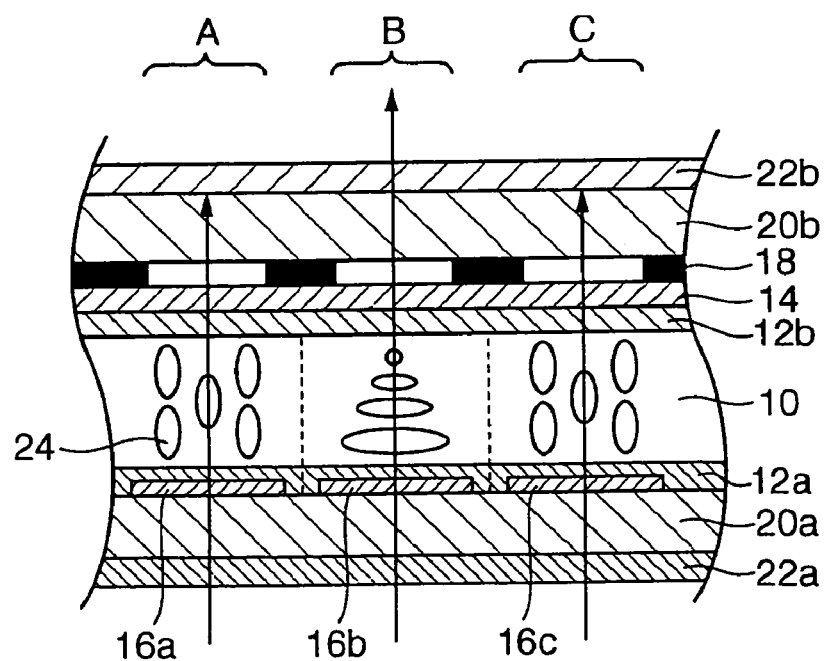
FIG. 1 is an explanatory diagram for explaining a light point defect pixel.

When voltage is applied to the pixels by means of the pixel electrodes 16a through 16c and the opposing electrode 14, at non-defect pixels A and C, as shown in FIG. 1(B), the liquid crystal molecules 24 align themselves perpendicular to the substrate and the light transmitted through the incident side polarizing plate 22a passes through the liquid crystal layer 10 without its axis of polarization being changed. As a result, the light transmitted through the liquid crystal layer 10 cannot be transmitted through the exiting side polarizing plate 22b, and the pixels A and C display black.

Figure 3A:
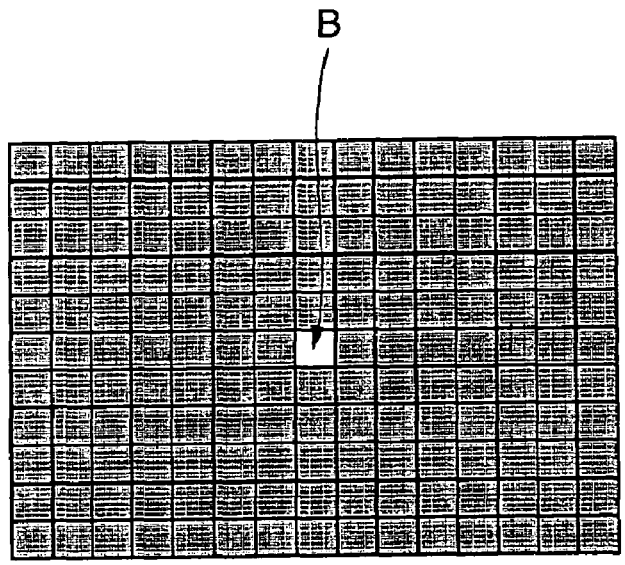
FIG. 3(A) shows stylistically a light point defect, and FIG. 3(B) a black spot defect. A black spot defect is less conspicuous than a light point defect.

On the other hand, with pixel B, voltage can not be applied due to a defect, and thus the alignment of the liquid crystal molecules 24, due to the orientation restraining force of the alignment film, remains twisted as before. Thus the oscillation component of the light transmitted through the incident polarizing plate 22a is rotated 90 degrees during passing through the liquid crystal layer 10, and is transmitted through the exiting side polarizing plate 22b. As a result, pixel B always displays white and becomes a light point defect. As shown stylistically in FIG. 3(A), when the whole screen is driven back, the light point defect pixel B is readily recognized by the human eye and is extremely conspicuous, degrading the quality of the liquid crystal display device.

Figure 2A:
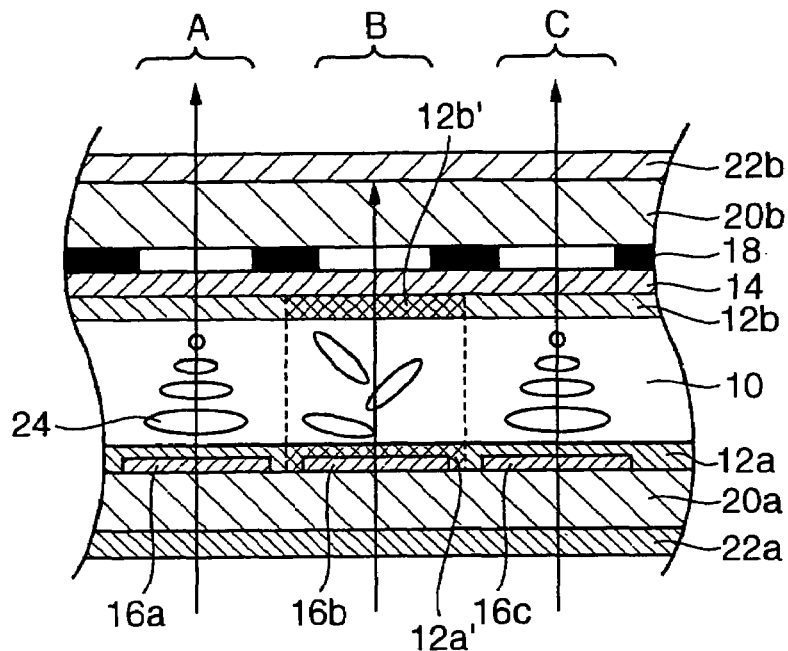
FIG. 2(A) shows the state where voltage is not applied to the pixels and FIG. 2(B) the state where voltage is applied to the pixels.

Next, using FIG. 2, the state after the properties of the alignment film are changed by irradiating the liquid crystal display device shown in FIG. 1 with laser light is described. FIG. 2(A) shows the state where voltage is not applied to the pixels. At this time, for non-defect pixels A and C, the liquid crystal molecules of the liquid crystal layer 10 are aligned in twisted alignment in conformance with the alignment film, and the light transmitted through the incident side polarizing plate 22a is transmitted through the exiting side polarizing plate 22b. As a result, pixel A and pixel C display white.

On the other hand, with pixel B, due to a change in the properties of the alignment film, the orientation restraining force is reduced or eliminated, and the liquid crystal molecules do not align themselves in a twisted manner. As a result, the oscillation component of the light is not rotated during passing through the liquid crystal layer 10, and the light cannot be transmitted through the exiting side polarizing plate 22b. The pixel B thus displays black in the state where a voltage source is not applied.

Figure 2B:
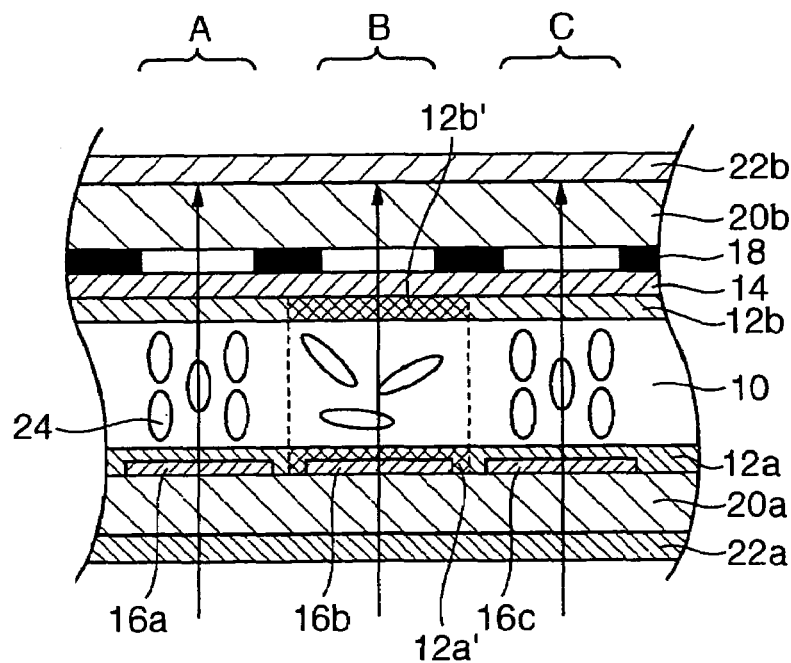
FIG. 2 is an explanatory diagram showing achieving a black spot through laser irradiation of a light point defect pixel.

FIG. 2(B) shows the state of applying voltage to a liquid crystal display device after irradiating it with laser light. By applying voltage to pixels A through C, the liquid crystal molecules in pixels A and C align themselves perpendicular to the substrate. On the other hand, in pixel B, due to a defect, voltage is not applied. Consequently, in all pixels A through C, the liquid crystal molecules 24 do not align themselves in a twisted manner. As a result, the light transmitted through the polarizing plate 22a is not rotated during passing through the liquid crystal layer 10, and thus becomes unable to be transmitted through exiting side polarizing plate 22b, resulting in a black display.

Figure 3B:
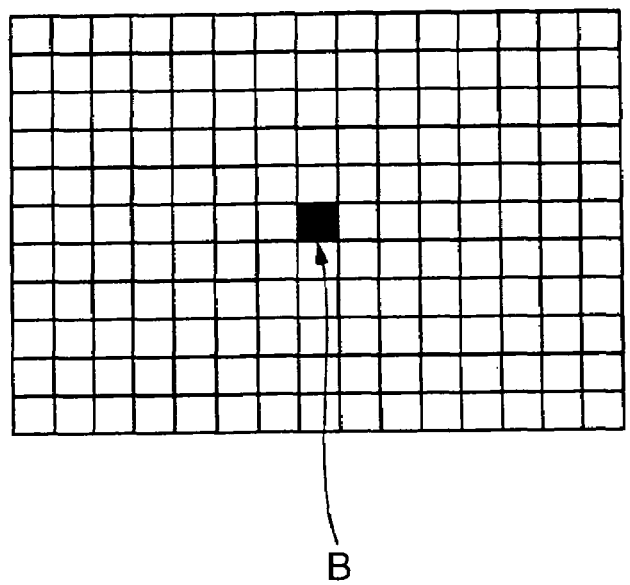
FIG. 3 is an explanatory diagram showing a light point defect pixel and a black spot defect pixel.

By irradiating pixel B with laser light and changing the properties of the alignment film, it can be made a black spot defect pixel which is always black, both in the case that voltage is applied and the case that it is not applied. Due to the characteristics of the human eye, black spot defects are less conspicuous than light point defects (refer to FIG. 3(B)) and, in terms of product-worthiness, one could consider that by converting the defect to a black spot, the quality of the liquid crystal display will be improved because the defect can then be treated as a minor defect.

Figure 4:
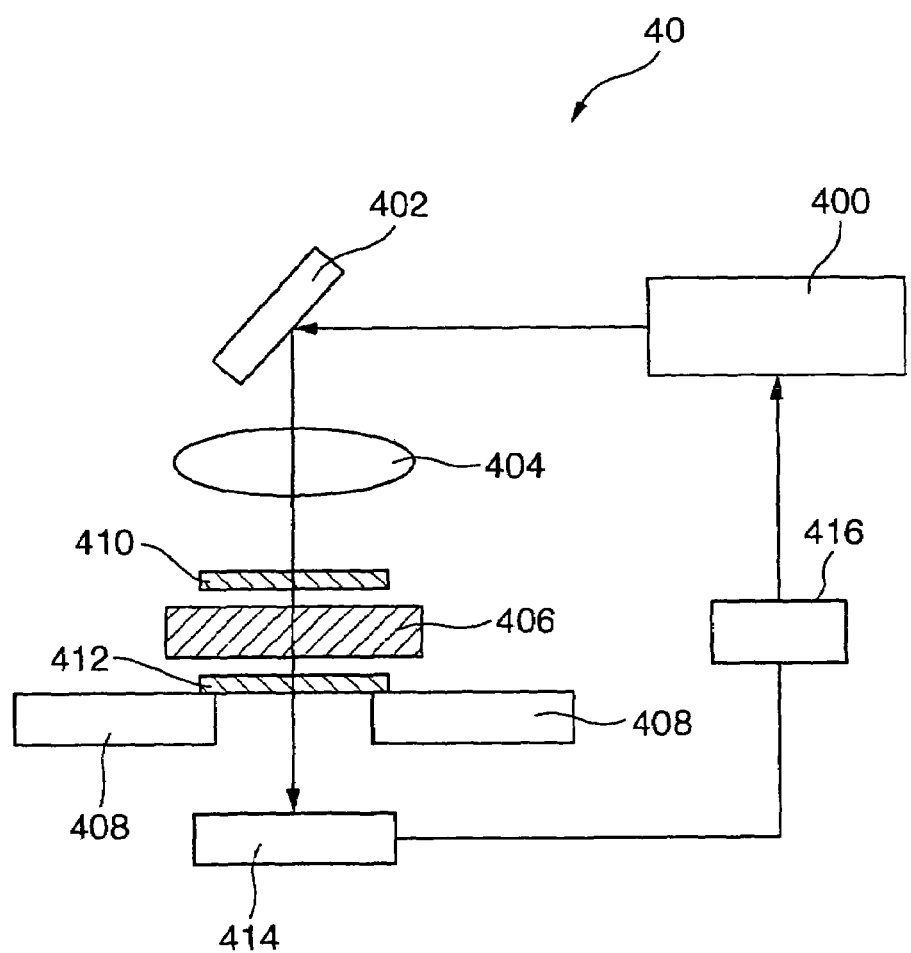
FIG. 4 is a summary diagram showing the defect repair method and the defect repair apparatus of the present invention.

FIG. 4 shows one embodiment of the defect repair apparatus for irradiating the alignment film of a defective pixel with laser light. A laser irradiation device 40 comprises a laser oscillator 400, a table (stand) 408 on which a liquid crystal display device is mounted, and a power meter 414 which measures the laser light transmitted through a liquid crystal display device 406.

The laser oscillator 40 can generate, for example, laser light with wavelengths of 355 nm, 405 nm, and/or 441 nm which wavelengths are readily absorbed by a general polyimide alignment film. The table 408 is capable of position adjustment in the X, Y and Z directions. Laser light generated from the laser oscillator 400 is reflected by a mirror 402 and, having its focal point narrowed by a lens 404, is irradiated onto a specified pixel of the liquid crystal display device 406. A through-hole is provided in the center of the table 408, so that if laser light is transmitted through the liquid crystal display device, it will be detected by the power meter 414.

With the present embodiment, it is not the final product of the liquid crystal display device that is repaired. Rather, the light point defect pixel is repaired by irradiating a laser onto the liquid crystal panel 406 before mounting the polarizing plates, in other words, onto the structure made up of the liquid crystal layer, the alignment film, the electrodes, and the black mask interposed between two glass substrates. Then, when the liquid crystal panel 406 is mounted on the table 408, two polarizing plates 410 and 412 are positioned to hold the panel.

Here, if both polarizing plates are positioned so that light oscillation components of the same direction are transmitted, light point defect pixels will not transmit light when voltage is not applied. However, by irradiating laser light onto it, the orientation restraining force of the orientation layer is reduced and, in proportion, the liquid crystal molecules of the liquid crystal layer become un-oriented so that they twist, and because the oscillation component of the laser light transmitted through the polarizing plate 410 is not rotated, it can also be transmitted through the polarizing plate 412. The laser light transmitted through the polarizing plate 412 is further transmitted through the through-hole in the table 408 and is detected by the power meter 414. In this way, the increase in light intensity detected by the power meter 414 becomes an indicator of the reduction in the orientation restraining force of the alignment film.

In the case that the polarizing plates are arranged to transmit light oscillation components whose angles differ by 90 degrees, light transmission through the polarization plate will gradually become impossible in proportion to the change in properties of the alignment film. Consequently, in this case, by detecting the reduction in the transmitted light with the power meter, the change in the properties of the alignment film can be evaluated. Further, because in general it is easier to detect increasing light intensity, rather than detecting the weakening of transmitted light. Therefore, by arranging the two polarizing plates so that light oscillation components of the same direction are transmitted, it is possible to detect with higher sensitivity the reduction of the orientation restraining force of the alignment film, in other words, the degree to which the defect is eliminated.

If the laser light is detected by the power meter 414, the power meter 414 outputs to the laser oscillator 400 an oscillation stopping signal in order to stop the laser oscillation. Specifically, for example, a feedback control mechanism 416 is provided between the power meter 414 and the laser oscillator 400 and by means of this feedback control mechanism 416, responsive to the strength of the light detected by the power meter 414, a signal to control laser oscillation can be outputted to the laser oscillator 400. By doing this, just the laser light required to reduce the orientation restraining force of the alignment film is irradiated and defects can be repaired efficiently.

Further, in the laser irradiation apparatus 40, if the two polarizing plates 410 and 412 are arranged so that they transmit light oscillation components which differ by 90 degrees and if the light irradiated by the laser and transmitted is detected by power meter 414, it also is possible to detect the location of light point defect pixels. Once the location of a light point defect pixel is detected, if one of the polarization plates is rotated 90 degrees and that defective pixel is irradiated with laser light, then it is possible to evaluate the degree of defect repair by detecting with power meter 414 the intensity of the laser light transmitted through the polarizing plate 412.

As described above, by means of the defect repair method of the present invention, through a simple process of irradiating a laser light one time, light point defect pixels can be made into black spots, without impacting the surrounding pixels. With this method, the blackened pixels will be maintained and will not return to light points even with the passage of time. Also, with the defect repair method of the present invention, the location of defects and the degree of repair are detected and the alignment film of the defective pixels can efficiently be broken down.

Further, the present invention need not be limited to the content of the above-mentioned embodiments and various forms of implementation are possible within the scope of the gist of the invention. For the lens, a condenser lens may be used or an imaging lens may be used, and for the orientation restraining force of the alignment film, instead of laser light, it is acceptable to use and detect another light source. Moreover, for specifying the location of the defective pixel a power meter or an alignment camera could be used.

Figure 5A:
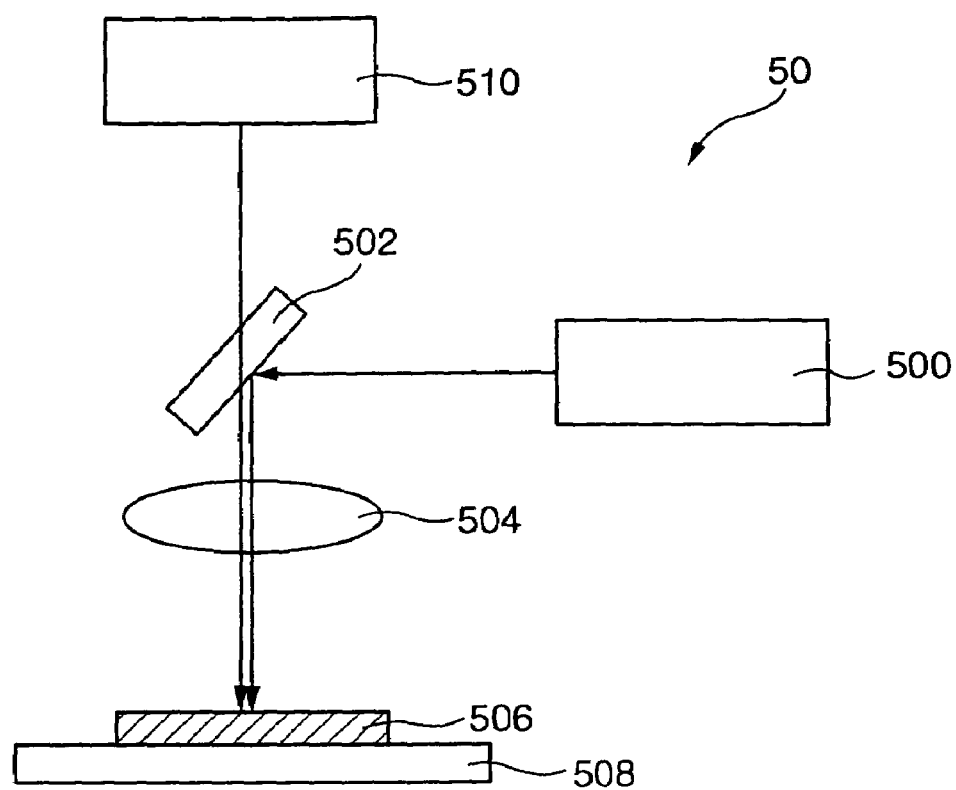
FIG. 5(A) is a summary diagram showing one embodiment of a laser irradiation device with a condenser lens.

FIG. 5 shows one embodiment of the laser irradiation device wherein a condenser lens is used. A laser irradiation device 50 comprises a laser oscillator 500, a mirror 502, a condenser lens 504, a table 508 on which is mounted the liquid crystal display device such that the position thereof in the X, Y, and Z directions can be controlled, and an alignment camera 510. The laser light outputted from the laser oscillator 500 is reflected by the mirror 502 and is irradiated onto a liquid crystal display device 506 via the lens 504.

The location of the defective pixel can be detected by means of the alignment camera 510, and by moving the table 508 in the XY-direction, adjustment can be made so that the laser light irradiates the defective pixel.

Figure 5B:
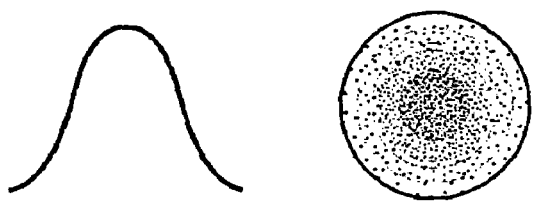
FIG. 5(B) is a diagram showing the intensity distribution and beam shape of the laser light.

Because the lens 504 is a condenser lens, the intensity distribution of the laser light irradiated onto the liquid crystal device 506 becomes as shown in the left diagram of FIG. 5(B) and the beam shape becomes as shown in the right diagram. As a result, the area of irradiation can be controlled by moving the table 508 in the Z-direction and it becomes possible to irradiate the laser light on the defective pixel only, without impacting surrounding pixels.

Whether or not the properties of the alignment film have changed due to laser light irradiation can be detected by the alignment camera 510. For example it would be acceptable to make the configuration of the table 508 such that light can be transmitted through part or all of it and to provide a light source under the table 508 so that changes in the light transmissivity of the liquid crystal display device 506 are observed by the alignment camera 510. Through such a configuration, progress in the change of the alignment film properties can be observed, and it is possible to control the system such that when the prescribed change in properties has been reached, irradiation of the laser light is stopped.

Figure 6A:
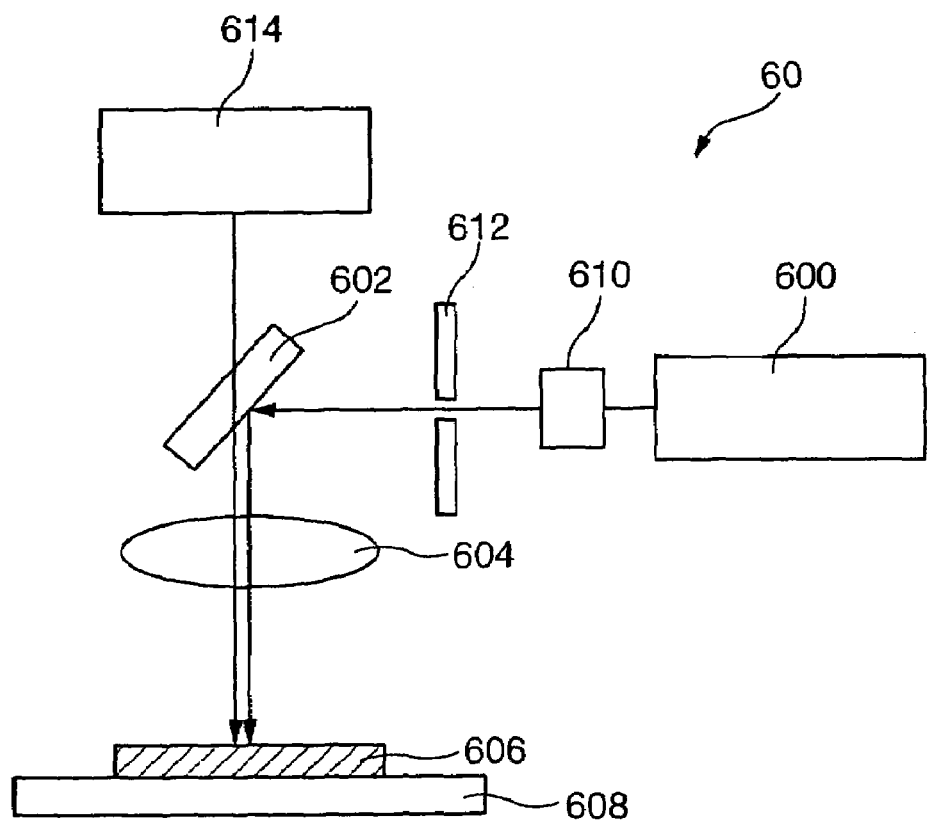
FIG. 6(A) is a summary diagram showing one embodiment of a laser irradiation device with an imaging lens.
Figure 6B:
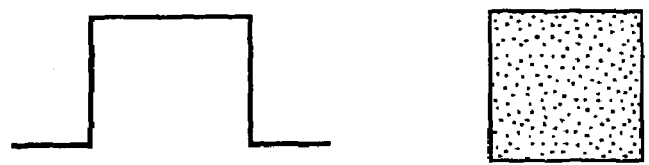
FIG. 6(B) is a diagram showing the intensity distribution and beam shape of the laser light.

FIG. 6 shows one embodiment of the laser irradiation device wherein an imaging lens is used. A laser irradiation device 60 comprises a laser oscillator 600, a homogenizer 610, a rectangular mask 612, a mirror 602, an imaging lens 604, a table 608 whose the position in the XY-direction can be controlled, and an alignment camera 614. A liquid crystal display device 606 is mounted on the table 608. The laser light transmitted through the homogenizer 610 and the rectangular mask 612 is reflected by the mirror and is irradiated onto the liquid crystal display device 606 via the imaging lens. The intensity distribution of the laser light irradiated onto the liquid crystal device 606 becomes as shown in the left diagram of FIG. 6(B) and the beam shape becomes as shown in the right diagram so that the exact pixel is irradiated with a uniform intensity.

As a result, with laser irradiation device 60, the pixel having a defect can irradiated by moving the table in the XY-direction only, without the need to move it in the Z direction.

The other structures of the laser irradiation device 60 are the same as those of the laser irradiation device 50 and a description of them is omitted here.

I claim:

1. A method for repairing a light point defect pixel of a liquid crystal display device having a liquid crystal panel which comprises a pair of substrates, a liquid crystal layer interposed between said pair of substrates, and a pair of alignment film each of which is provided between said substrate and said liquid crystal layer, which restrains the orientation of the liquid crystals of said liquid crystal layer; the method comprising irradiating laser light on a region of said alignment film corresponding to said light point defect pixel to locally reduce or eliminate the orientation restraining force of said alignment film, providing polarizing plates positioned on one side and the other side of the liquid crystal panel when said laser light is irradiated, respectively; setting axes of polarization such that light transmitted through one of said polarizing plates can be transmitted through the other polarizing plate when the orientation restraining force of the alignment film is reduced or eliminated; and detecting the reduction or elimination of the orientation restraining force of the alignment film in real time by measuring the amount of said laser light transmitted through one of said polarizing plates after passing through the other polarizing plate and liquid crystal panel.

2. The method for repairing a defect of a liquid crystal display device according to claim 1 wherein said alignment film comprises an organic film or polymer film and the wavelength of said laser light is 450 nm or less.

* * * * *